May 11, 1926.

G. F. HOCHRIEM

WEIGHING SCALE

Original Filed Sept. 14, 1921    2 Sheets-Sheet 1

1,584,097

Inventor:
Gustav F. Hochriem
By Foree Bain & Hinkle Attys

May 11, 1926.　　　　　　　　　　　　　　　　1,584,097
G. F. HOCHRIEM
WEIGHING SCALE
Original Filed Sept. 14, 1921　　2 Sheets-Sheet 2
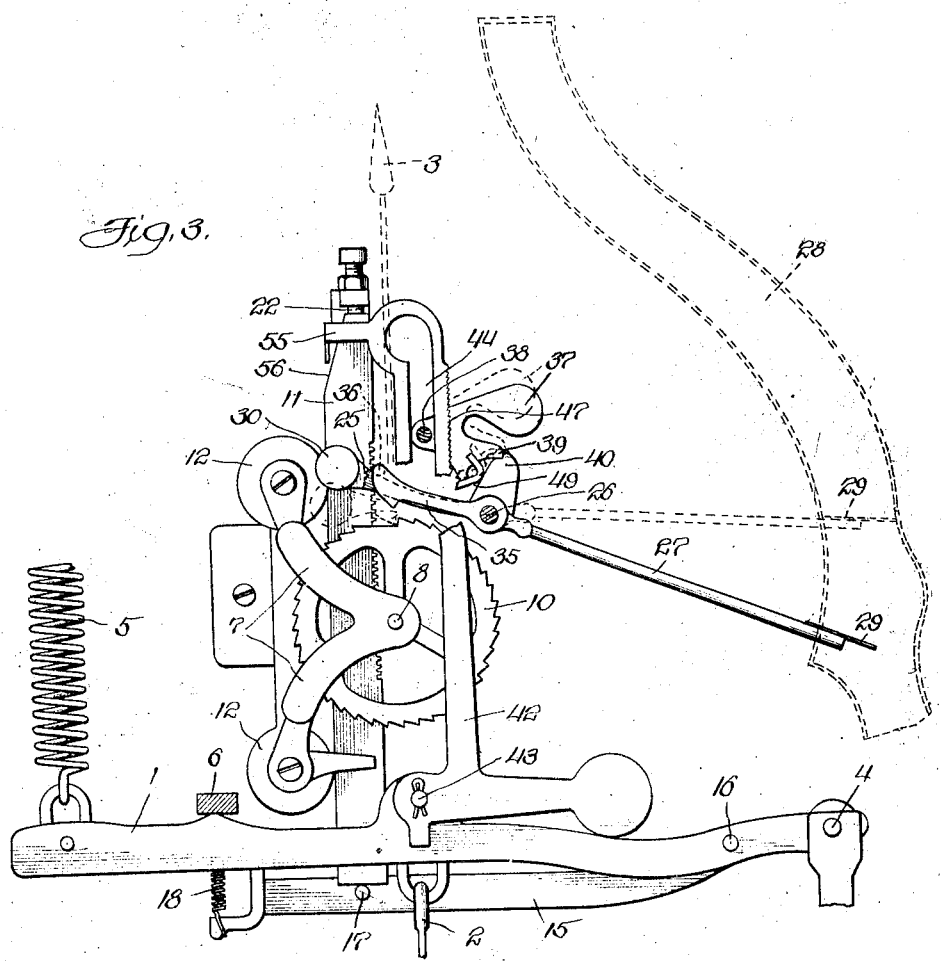
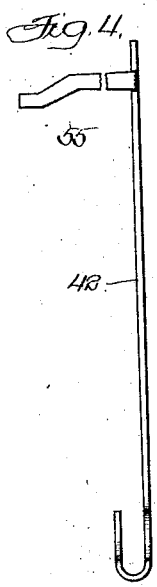
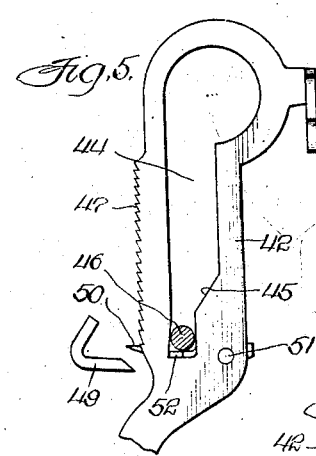
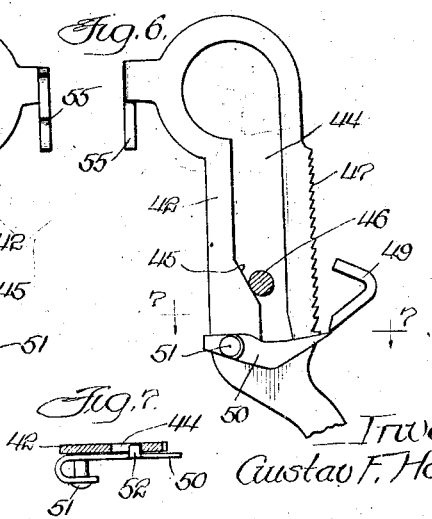
Inventor:
Gustav F. Hochriem
By Force Bain & Hinkle Attys Patented May 11, 1926.

1,584,097

UNITED STATES PATENT OFFICE.

GUSTAV F. HOCHRIEM, OF CHICAGO, ILLINOIS.

WEIGHING SCALE.

Continuation of application Serial No. 500,523, filed September 14, 1921. This application filed November 21, 1921. Serial No. 516,551.

This invention relates to weighing scales.

It relates particularly to check or coin controlled automatic weighing scales.

This application is a continuation of my copending application Serial No. 500,523, filed Sept. 14, 1921.

Various types of such scales are in common use. Ordinarily such scales are constructed and arranged on the plan of indicating only one weight for each coin deposited. It has been found, however, that after the scales have been in service for a time the initial adjustment, even though accurately made in the beginning, has been lost. Thereafter, in many instances, the scales will weigh without the deposit of a coin and in other instances the deposit of a coin will not result in an indication.

The consequent loss in collections due to the first defect and the criticism, and complaint due to the second defect, render the scales unsatisfactory.

One of the objects of this invention is to provide an improved weighing scale.

Another object is to provide a scale wherein the aforesaid defects are eliminated.

Another object is to provide an efficient, reliable and inexpensive arrangement for insuring the continuing proper operation of the scales.

Other objects and advantages will hereinafter appear.

An embodiment of the invention is illustrated in the accompanying drawings, wherein only the pointer operating and coin controlled mechanism are shown.

The views in the drawings are as follows:

Fig. 3 is a front elevation, partly in section, showing the mechanism in normal or zero position.

Fig. 4 is an end elevation of the trip.

Fig. 5 is an enlarged side elevation of a part of the tripping mechanism in normal position.

Fig. 6 is an enlarged reverse side elevation of a part of the tripping mechanism in tripping position, and Fig. 7 is a section on the line 7—7 of Fig. 6.

Figure 1:
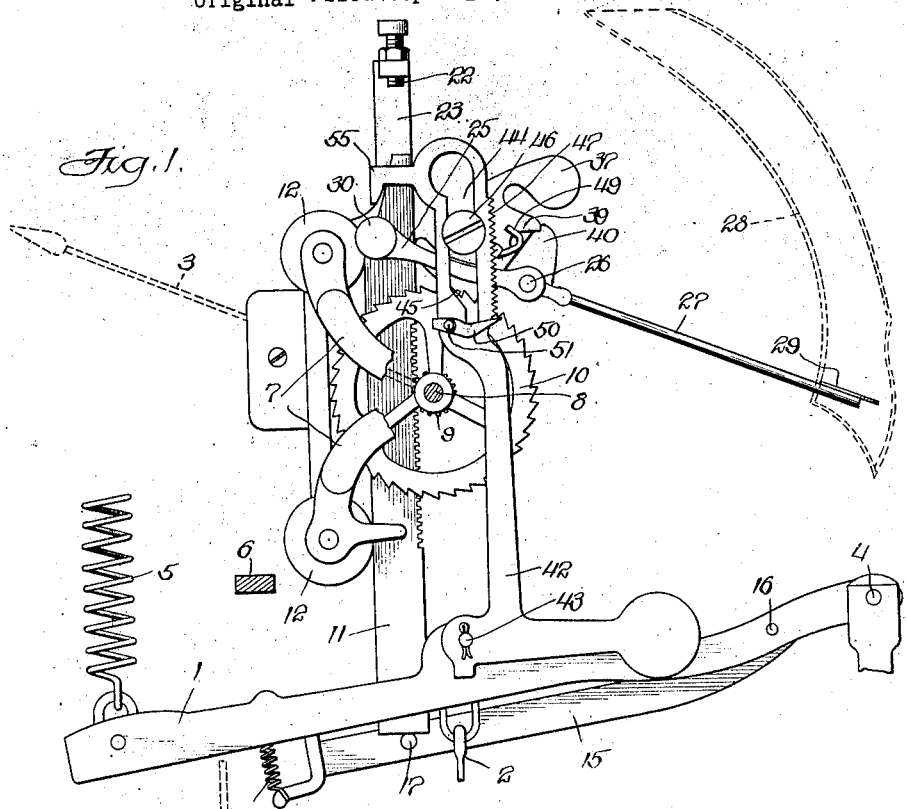
Fig. 1 is a front elevation, partly in section, of the mechanism in one weighing position.
Figure 2:
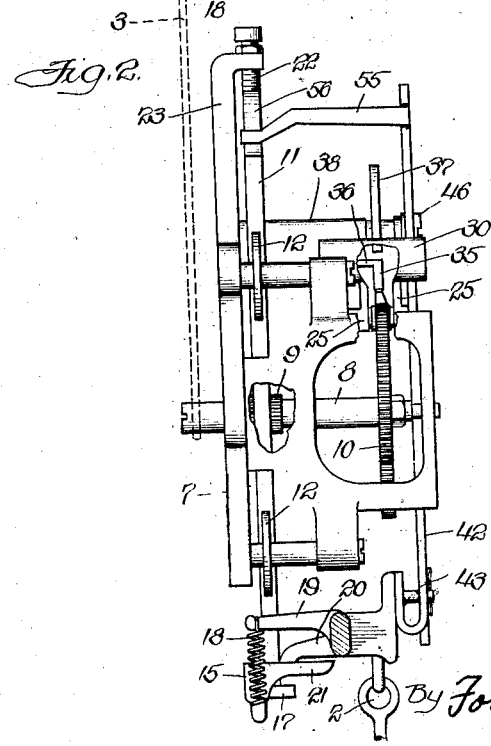
Fig. 2 is an end elevation thereof partly in section.

The scale has a weight support, such as the usual platform, for supporting the person or object being weighed and a dial for designating the weight. These elements are not shown as various types are well known in the art.

The platform is connected to a lever or beam 1 by means of a suitable connection 2. A weight indicating index, such as a movable pointer 3, is adapted to travel over the dial to indicate the weight.

The operating mechanism is secured, in any desired manner, to the frame of the scale. Beam 1 is pivoted to the frame on a stationary pivot 4. The movement of the platform is communicated to beam 1 through connection 2 and causes the beam to move about pivot 4. A biasing spring 5, secured to the outer end of beam 1 and to the frame, returns the beam to normal or zero position against a stop 6 when the weight is removed from the platform and opposes or balances the weight on the platform.

A bracket 7, secured to the frame, provides bearings for a shaft 8. Shaft 8 has pointer 3 rigidly secured thereto. Shaft 8 also carries a pinion 9 and a ratchet wheel 10.

Pinion 9 engages the teeth on a rack-bar 11 which is slidably mounted in bracket 7. The sliding of rack-bar 11 is facilitated by a pair of rollers 12 carried by bracket 7. When the rack-bar is caused to move up and down, as will be hereinafter described, shaft 8 is caused to rotate, carrying pointer 3 over the dial.

Beam 1 has an arm 15 pivoted thereto, by a pin 16. Arm 15 has a stud 17 extending therefrom. Rack-bar 11 rests upon stud 17 being held thereon by the force of gravity which is always tending to lower the rack-bar.

A spring 18, secured to the free end of arm 15 and a projecting lug 19 on beam 1 resiliently biases beam 1 and arm 15 together. The amount they may be moved together by spring 18 is determined by cooperating stops 20 and 21 on beam 1 and arm 15, respectively.

The upper or zero position of rack-bar 11 is determined by an adjustable stop 22 carried on an extension 23 of bracket 7. By varying the position of stop 22 the normal or zero position of pointer 3 may be accurately set to correspond to the zero of the dial.

The operation of the weight indicating mechanism is controlled by a bifurcated coin controlled lever 25. Lever 25 is pivotally carried on a post 26 projecting from the frame and has an extension rod 27 which projects into a coin chute 28. The end of rod 27 carries a small plate 29 which lies in chute 28 in a position to be struck by a deposited coin. Lever 25 is provided with a counter weight 30 on one end, which weight normally raises the other end of the lever and rod 27 to the position shown by the dotted lines of Fig. 3. However, when a deposited coin drops down the chute and strikes plate 29, lever 25 is rotated to the position shown by the full lines of Fig. 3.

A pawl 35 is located between the bifurcated section of lever 25 and is pivoted on post 26. Pawl 35 is adapted normally to engage the teeth of ratchet wheel 10 to hold the same and prevent the gravity impelled movement of rack-bar 11 and consequently the indication of a weight on the platform unless a coin has been previously deposited. Pawl 35 has a laterally extending lug 36 which lies above and is adapted to be raised by lever 25. Consequently, when a deposited coin strikes plate 29 and rotates lever 25, the tooth of pawl 35 is raised from ratchet wheel 10, releasing the ratchet wheel so that gravity may depress rack bar 11 and rotate pointed 3 by an amount determined by the weight's depression of beam 1.

As soon as lever 25 has been moved, the deposited coin falls beyond plate 29 into the cash box. The mechanism, having been set into weighing condition by the deposit of the coin, is retained in this condition until a weight has been indicated by the pointer. The retension of weighing condition is accomplished by a latch 37. Latch 37 is pivotally carried on a post 38 which projects rearwardly from the scale frame, and is counter-weighted to assume the position shown by the full lines of Figs. 1 and 3. Latch 37 has a projecting tooth 39 which cooperates with a shoulder on a projecting lug 40 of lever 25. In normal or non-weighing position, with plate 29 and lever 26 in the position shown by the dotted lines of Fig. 3, tooth 39 of latch 37 rests upon the top of lug 40 and rack-bar 11 is held against movement. When a deposited coin moves lever 25 and releases the rack-bar, the top of lug 40 is withdrawn from its supporting position relative to latch 37 and the latch falls so that its tooth 39 engages the shoulder on lug 40. Thus latch 37 holds lever 24 and consequently pawl 35 in releasing position wherein the rack-bar is free to move down in response to the weight's depression of beam 1.

In order to release the coin controlled system so that it may again assume rack-bar holding position means are provided for tripping latch 37 when a weight has been indicated and beam 1, rack-bar 11 and pointer 3 start back to normal position upon the removal of the weight from the scale platform.

A trip 42 is provided to release the coin controlled system. Trip 42 comprises a thin bar of metal pivotally connected to beam 1 on a pivot pin 43. The trip has a slot 44 extending lengthwise thereof with an inclined shoulder 45 near its bottom. A screw 46, threading into post 38, lies in slot 44. One edge of trip 42 is provided with a series of small teeth 47. These teeth are adapted to cooperate with a small dog 49 which may be formed integrally with latch 37. When beam 1 is depressed it carries trip 42 with it. If lever 25 and latch 37 have not been tripped by the deposit of a coin, dog 49 is out of the path of teeth 47. If the deposit of a coin has tripped lever 25 and latch 37 then the teeth engage dog 49. On the downward movement of trip 42 dog 49 rides idly over teeth 47. When the weight is removed, and beam 1 and trip 42 move upwardly under the force of spring 5, the nearest tooth 47 engages dog 49, elevates the end of pawl 37 and causes the release of lever 27 and pawl 35. Thereupon the coin plate 29 assumes its normal position blocking chute 28 and pawl 35, coacting with the teeth of ratchet wheel 10, prevents rack-bar 11 and pointer 3 from following any subsequent depression of beam 1 until another coin is deposited.

Adjacent the lowest of teeth 47 trip 42 carries a movable pawl 50. Pawl 50 is pivoted to trip 42 by a pin 51. The forward end or point of pawl 50 extends beyond the points of teeth 47 into the plane of dog 49 to be engaged thereby. Pawl 50 has a small lug 52 projecting radially therefrom into slot 44. This lug engages the bottom of slot 44 to limit the downward movement of the point of the pawl. It also engages the rear wall of the slot to limit the rotation of the pawl and prevent its being turned over.

When beam 1 and trip 42 move to fully raised position and consequently as the pointer arrives approximately at zero position pawl 50 moving upwardly strikes dog 49. This insures the return of the coin controlled mechanism even though, because of wear or other loss of adjustment, the dog has not been engaged by teeth 47 sufficiently to effect the return to normal. On the downward movement of trip 42 pawl 50 and dog 49 do not interfere with each other as the pawl rotates about its pivot and consequently does not obstruct the operation of any of the mechanism. Should the trip move suddenly downward and the pawl be struck a blow by dog 49, stop 52 engaging the rear wall of slot 44 prevents the pawl from being thrown out of operative position. As soon as the dog has passed the pawl returns with its stop against the bottom of slot 44.

The inclined shoulder 45 throws trip 42 away from dog 49 at the upper end of the trip's travel so that the dog and consequently latch 37 are never permanently retained in such a position that pawl 35 will not be held out of position to release ratchet wheel 10. Such a condition would prevent the indication of a weight upon the deposit of a coin and would cause dissatisfaction.

To protect the teeth of trip 42 the trip has an extending arm 55 which is adapted to engage a beveled surface 56 near the top of rack-bar 11. When the rack-bar is held from movement because of a failure to deposit a coin, the depression of beam 1 by weights on the platform does not cause the small teeth to ride over dog 49 because the coaction of surface 56 and arm 55 moves the rack bar to such an extent that the teeth do not strike dog 49.

Briefly the operation is as follows:—

Normally the mechanism is in the position shown by the dotted lines of Fig. 3. Weights on the platform depress beam 1, lever 15 and trip 42, but the pointer is not moved because pawl 35, engaging ratchet wheel 10, does not allow the rack-bar to fall.

The deposit of a coin moves lever 25 to the position shown by the full lines of Fig. 3 where it is held by latch 37. The raising of lever 25 raises pawl 35 releasing wheel 10 so that the rack-bar moves down by the force of gravity until it is stopped by coming in contact with stop 17 on lever 15. The depression of rack-bar 11 rotates shaft 8 and the pointer an amount determined by the position of lever 15 whose position is determined by the weight on the platform.

When the weight is removed from the platform dog 49 is engaged by teeth 47 if the same are not worn and latch 37 is tripped to allow lever 25, pawl 35 and coin plate 29 to resume their normal position. If the small teeth do not reset the mechanism pawl 50 insures this result.

Having described my invention what I claim as new and desire to secure by Letters Patent, is:—

In a weighing scale having a weight support and a weight indicating pointer, the combination of a beam adapted to be actuated by the support, a gravity actuated rack-bar the position of which is determined by the position of the beam, a pinion interconnecting the rack-bar and the pointer, a ratchet wheel associated with the pinion, a pawl adapted to cooperate with the ratchet wheel to prevent the movement of the pinion and rack-bar in response to depression of the beam, a coin controlled lever for disengaging the pawl from the ratchet wheel when a coin is deposited, a latch for holding the pawl out of engagement with the ratchet wheel after a coin has been deposited and until a weight has been indicated, a slotted trip pivotally connected to the beam and having a ratchet tooth which cooperates with the latch to cause the release of the pawl and the coin controlled lever after a weight has been indicated, and a pivoted pawl on the trip for insuring that the trip is disengaged from the latch as the beam approaches normal to insure the indication of a weight upon the subsequent deposit of a coin.

In testimony whereof I hereunto subscribe my name.

GUSTAV F. HOCHRIEM.